United States Patent
Allen et al.

(10) Patent No.: US 8,365,502 B2
(45) Date of Patent: Feb. 5, 2013

(54) COMPOSITE TUBE HAVING CO-BONDED END FITTINGS

(75) Inventors: Christopher T. Allen, Owens Cross Roads, AL (US); Patrick D. Bertrand, Woodenville, WA (US); Derek J. Fox, O'Fallon, MO (US); William B. H. Grace, Seattle, WA (US); Kenneth M. Harrison, Mukilteo, WA (US); Wesley L. Holman, Mill Creek, WA (US); Menelaos S. Kafkalidis, Lynnwood, WA (US); James R. Schnelz, Seattle, WA (US); Edward M. Fisher, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 1054 days.

(21) Appl. No.: 11/747,389

(22) Filed: May 11, 2007

(65) Prior Publication Data
US 2008/0129041 A1 Jun. 5, 2008

Related U.S. Application Data (63) Continuation-in-part of application No. 11/607,546, filed on Dec. 2, 2006.

(51) Int. Cl.
*E04C 3/00* (2006.01)
(52) U.S. Cl. ......... 52/843; 428/36.3; 428/36.9; 403/265
(58) Field of Classification Search ............ 52/843, 52/650.1; 428/36.3, 36.9; 403/265
See application file for complete search history.

(56) References Cited

U.S. PATENT DOCUMENTS

| | | | | |
|---|---|---|---|---|
| 2,076,632 A | * | 4/1937 | Goodall | 285/55 |
| 2,848,133 A | * | 8/1958 | Ramberg | 220/590 |
| 3,545,795 A | * | 12/1970 | Hertel et al. | 403/265 |
| 3,850,722 A | | 11/1974 | Kreft | |
| 4,089,190 A | * | 5/1978 | Worgan et al. | 464/180 |
| 4,185,472 A | * | 1/1980 | Yates et al. | 464/181 |
| 4,236,386 A | * | 12/1980 | Yates et al. | 464/181 |
| 4,238,539 A | * | 12/1980 | Yates et al. | 428/35.9 |
| 4,238,540 A | | 12/1980 | Yates et al. | |
| 4,256,412 A | * | 3/1981 | Tybus et al. | 403/267 |
| 4,530,379 A | * | 7/1985 | Policelli | 138/109 |
| 4,649,960 A | * | 3/1987 | Policelli | 138/109 |
| 4,706,364 A | * | 11/1987 | Aubry | 29/458 |

(Continued)

FOREIGN PATENT DOCUMENTS

| | | |
|---|---|---|
| AU | 515017 B2 | 3/1981 |
| GB | 2112689 A | 7/1983 |

(Continued)

OTHER PUBLICATIONS

Amendment submitted with RCE dated Aug. 17, 2010 for U.S. Appl. No. 11/607,546, 22 pages.

(Continued)

*Primary Examiner* — Brian Glessner
*Assistant Examiner* — Joshua Ihezie
(74) *Attorney, Agent, or Firm* — Yee & Associates, P.C.

(57) ABSTRACT

A structural member such as a strut includes a composite material tube having metal end fittings that are attached to the tube by co-bonded, double shear joints. The double shear bond joint construction reduces the residual stress on the bonds that result from mismatch of the coefficients of thermal expansion of the composite tube and the metal end fittings. The ends of the fittings that are bonded to the tube may include a stepped profile that functions to limit the peak stresses in the bonds.

9 Claims, 7 Drawing Sheets

U.S. PATENT DOCUMENTS

| | | | | |
|---|---|---|---|---|
| 4,792,320 A * | 12/1988 | Nickel | | 464/181 |
| 4,849,152 A * | 7/1989 | Rumberger | | 264/308 |
| 4,851,065 A * | 7/1989 | Curtz | | 156/172 |
| 5,281,454 A * | 1/1994 | Hanson | | 428/36.3 |
| 5,288,109 A * | 2/1994 | Auberon et al. | | 285/222.4 |
| 5,318,374 A * | 6/1994 | Rumberger | | 403/277 |
| 5,332,049 A * | 7/1994 | Tew | | 175/320 |
| 5,361,806 A * | 11/1994 | Lalikos et al. | | 138/109 |
| 5,591,120 A * | 1/1997 | Machida et al. | | 600/140 |
| 6,065,540 A * | 5/2000 | Thomeer et al. | | 166/297 |
| 6,464,591 B1 * | 10/2002 | Nakajima | | 464/181 |
| 6,719,058 B2 | 4/2004 | Salama et al. | | |
| 6,863,279 B2 | 3/2005 | Salama | | |
| 6,910,617 B2 * | 6/2005 | Yablochnikov | | 228/115 |
| 7,143,510 B2 * | 12/2006 | Myers et al. | | 29/888.1 |
| 7,427,237 B2 * | 9/2008 | Burkett | | 464/181 |
| 7,458,617 B2 * | 12/2008 | Leslie et al. | | 285/390 |
| 7,498,509 B2 * | 3/2009 | Brotzell et al. | | 174/21 R |
| 7,655,581 B2 | 2/2010 | Goering | | |
| 7,731,593 B2 * | 6/2010 | Dewhirst et al. | | 464/181 |
| 7,943,535 B2 | 5/2011 | Goering et al. | | |
| 2002/0106483 A1 * | 8/2002 | Obeshaw | | 428/116 |
| 2003/0106685 A1 * | 6/2003 | Salama et al. | | 166/244.1 |
| 2003/0107186 A1 * | 6/2003 | Salama | | 277/602 |
| 2004/0012198 A1 * | 1/2004 | Brotzell et al. | | 285/249 |
| 2004/0086341 A1 * | 5/2004 | Salama et al. | | 405/224.2 |
| 2005/0199308 A1 * | 9/2005 | Swails et al. | | 138/109 |
| 2006/0258469 A1 * | 11/2006 | Dewhirst et al. | | 464/181 |
| 2008/0131630 A1 | 6/2008 | Schnelz | | |
| 2008/0261474 A1 * | 10/2008 | Goering | | 442/195 |
| 2009/0101328 A1 * | 4/2009 | Leslie et al. | | 166/65.1 |
| 2009/0278348 A1 * | 11/2009 | Brotzell et al. | | 285/249 |
| 2009/0311462 A1 * | 12/2009 | Goering | | 428/99 |

FOREIGN PATENT DOCUMENTS

| | | | |
|---|---|---|---|
| GB | 2383010 A | | 6/2003 |
| GB | 2424464 A | | 9/2006 |
| JP | 59050216 A | | 3/1984 |
| JP | 63015734 A | | 1/1988 |
| JP | 63166522 A | | 7/1988 |
| WO | 9737725 A2 | | 10/1997 |
| WO | 2005054694 A1 | | 6/2005 |
| WO | PCT/US 2007/021751 | | 10/2007 |
| WO | 2008066606 A1 | | 6/2008 |

OTHER PUBLICATIONS

USPTO Office Action dated Feb. 14, 2012 for U.S. Appl. No. 11/607,546, 13 pages.

Preliminary Amendment dated Dec. 11, 2006 for U.S. Appl. No. 11/607,546, 8 pages.

Preliminary Amendment dated May 4, 2007 for U.S. Appl. No. 11/607,546, 37 pages.

USPTO Requirement for Restriction dated May 27, 2009 for U.S. Appl. No. 11/607,546, 7 pages.

Response to Requirement for Restriction dated Jun. 18, 2009 for U.S. Appl. No. 11/607,546, 10 pages.

Response to Requirement for Restriction dated Sep. 8, 2009 for U.S. Appl. No. 11/607,546, 10 pages.

USPTO Office Action dated Dec. 24, 2009 for U.S. Appl. No. 11/607,546, 13 pages.

Amendment after Non-Final Office Action dated Mar. 22, 2010 for U.S. Appl. No. 11/607,546, 18 pages.

USPTO Final Office Action dated May 19, 2010 for U.S. Appl. No. 11/607,546, 12 pages.

International search report dated Mar. 7, 2008 regarding application PCT/US2007/021751, 3 Pages.

Response to Office Action, dated May 11, 2012, regarding U.S. Appl. No. 11/607,546, 28 pages.

USPTO Final Office Action, dated Jul. 9, 2012, regarding U.S. Appl. No. 11/607,546, 18 pages.

* cited by examiner

COMPOSITE TUBE HAVING CO-BONDED END FITTINGS

RELATED APPLICATIONS

This application is a continuation-in-part of U.S. patent application Ser. No. 11/607,546, filed Dec. 2, 2006.

TECHNICAL FIELD

This disclosure broadly relates to composite structural members, and deals more particularly with a composite tube having co-bonded metal end fittings.

BACKGROUND

Structural members formed from both composite and metallic materials are used in a variety of applications in the aerospace industry. For example, structural members such as struts may be formed from a composite material tube having metallic end fittings that attach the strut to other structure in an aerospace vehicle, such as a commercial aircraft. The strut may act as either a support or a connecting member, transferring force in either direction along the longitudinal axis of the strut. Thus, the strut may be subjected to either compressive or tension loading. The use of a composite tube normally provides a weight advantage over a metallic tube, while the use of metallic end fittings provides additional strength at points of attachment.

In some cases, the metallic end fittings may be attached to the composite tube using fasteners that pass through the tube and the fitting. This attachment technique may result in stress concentrations in the tube in the area around the fasteners, and therefore requires that the tube have a greater thickness in order to accommodate these localized stresses. This additional tube thickness increases both the weight of the structural member, and the cost of materials.

The use of fasteners may be obviated by bonding the end fittings directly to the composite tube. In order to form the attachment bond, a cylindrical section of the end fitting may be inserted into an open end of the tube and a bond is formed at the overlapping, contacting areas between the interior wall of the tube and the exterior wall of the end fitting. The axial length of the bond must be sufficient to withstand shear forces produced by the compression and/or tension loads which the structural member is designed to transfer. Higher loading therefore requires a longer bond length between the end fitting and the tube. Longer bond lengths create a problem, however, due to the difference in the coefficients of thermal expansion (CTE) of the composite tube compared to metal end fittings. This problem is due, in part to the process used to produce the bond. The bonding process involves curing the composite materials forming the tube at elevated temperature while the metal fitting is attached to the tube. In some cases, the metal fitting may be bonded to a prefabricated tube. In either case, the metal fitting expands a greater amount than the tube during the curing process, since the CTE of metal is higher than that of the composite material. Subsequent cooling of the metal and composite material results in the metal and the composite material contracting at different rates, producing residual stresses in the bond area. The residual stresses may be exacerbated as a result of the bond being subjected to thermal cycling and tension and/or compression loading during in-flight service. Thermal cycling may occur during typical aircraft operations when aircraft components are exposed to temperatures of about 90° F. or more on the ground to as low as about −60° F. or lower at typical flight altitudes.

Accordingly, there is a need for a bond construction that overcomes the problems mentioned above. Embodiments of the disclosure are directed toward satisfying this need.

SUMMARY

According to one embodiment of the disclosure, a structural member may include: a composite material tube having co-bonded inner and outer tube wall portions; and, a metal fitting having at least a section disposed between and co-bonded to the inner and outer tube wall portions. The section of the fitting forms a first bond joint with the inner tube wall portion and a second bond joint with the outer tube wall portion, providing a double shear bond. In one embodiment, the bond joints may be scarf joints, while in another embodiment, the joint may have steps of decreasing thickness in an axial direction. The double shear bond joint may reduce stress on the bond resulting from the mismatch of the coefficients of thermal expansion of the metal fitting and the composite tube. Co-bonding of the fitting with the composite tube results in a bond strength that may satisfy design load requirements, without the need for fasteners, although fasteners may also be used.

The co-bonded double shear joint of at least one embodiment may also reduce the residual stresses present in the bond to acceptable levels, and may also reduce peel stresses in the joint, especially at the ends of the joint. The double shear joint construction is also advantageous in that the eccentricity of the components forming the joint may be reduced.

According to another disclosed embodiment, an aircraft strut is provided, comprising: a tubular member formed of laminated plies of reinforced polymer resin; at least one metal fitting; and two overlapping, co-bonded joints between the tubular member and the metal fitting. The tubular member may include an inner tube wall portion and an outer tube wall portion, and the metal fitting may include a tang disposed between and co-bonded to the inner and outer tube wall portions. The tang may be disposed coaxial with the tubular member and may be tapered in the direction of the length of the tubular member. The tang may include a plurality of stepped wall surfaces, and the inner and outer tube wall portions each may include multiple plies of the reinforced polymer resin co-bonded to each of the steps.

According to another disclosed embodiment, a composite material strut is provided, comprising: a tube having a wall including laminated plies of fiber reinforced resin, and a metal fitting having a tapered portion extending into an end of the tube wall. The tapered portion extends between and is co-bonded to the plies in the tube wall to form a double, overlapping joint between the tube and the fitting. The laminated plies may be arranged in groups forming ply drop offs along the length of the tube in the area of the double joint.

These and further features, aspects and advantages of the embodiments will become better understood with reference to the following illustrations, description and claims.

BRIEF DESCRIPTION OF THE ILLUSTRATIONS

DETAILED DESCRIPTION

Figures 1, 2:
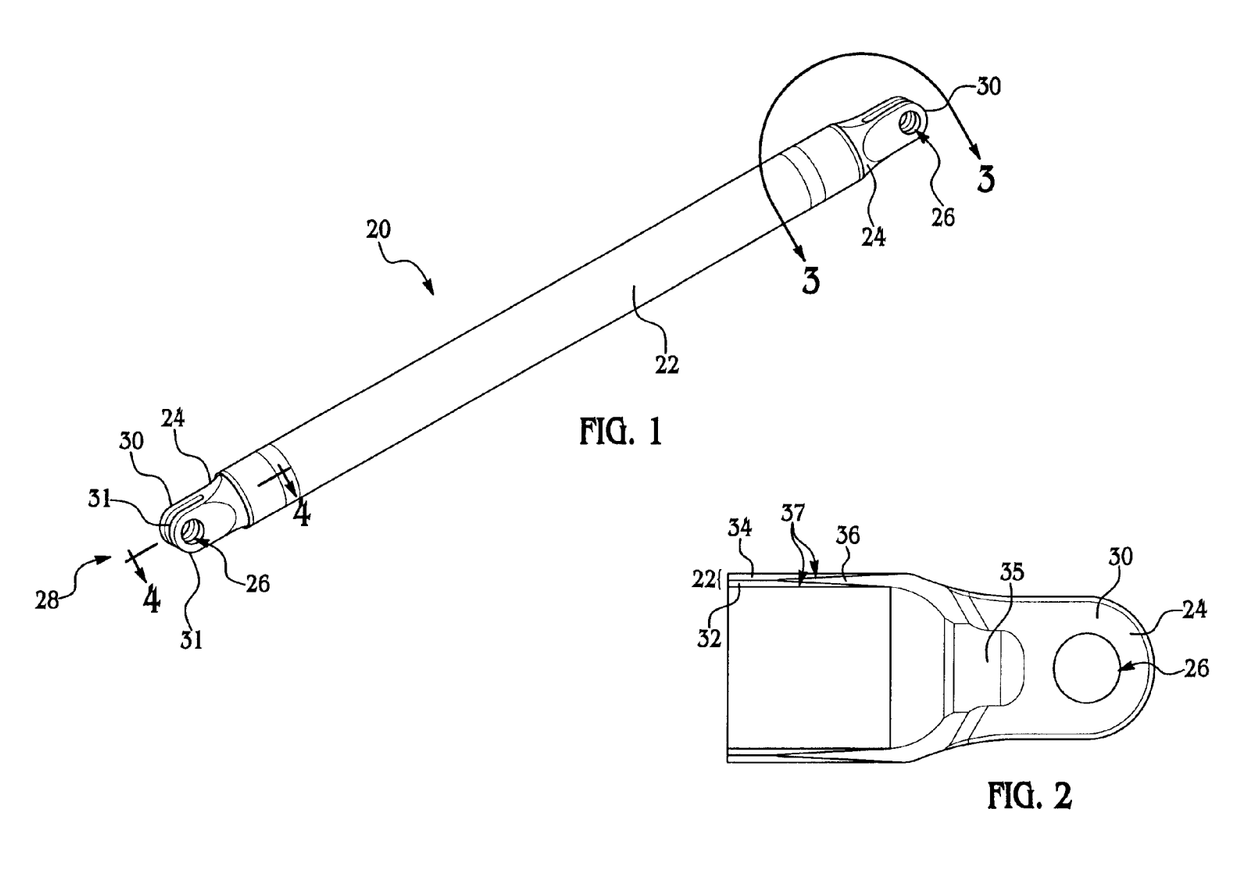
FIG. 1 is a perspective illustration of a strut having a composite material tube and metallic end fittings, according to an embodiment.
FIG. 2 is a longitudinal section illustration of an end of the strut depicted in FIG. 1, showing the use of a scarf joint according to one embodiment.
Figure 3:
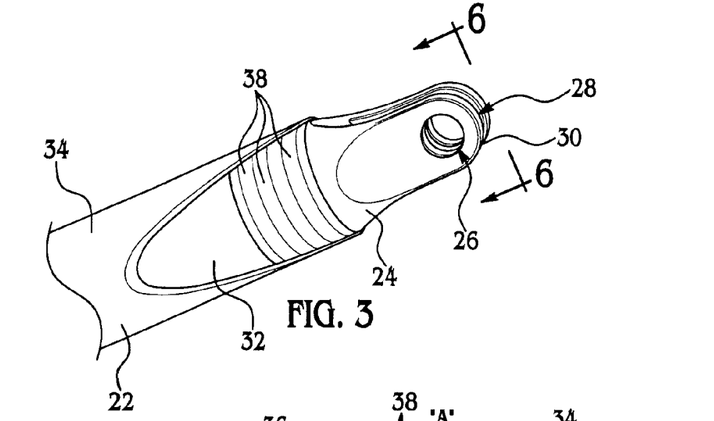
FIG. 3 is a perspective illustration of one end of the strut shown in FIG. 1, a portion of the outer tube wall portion having been broken away to reveal the inner tube wall.

Referring first to FIGS. 1 and 2, a structural member in the form of a strut 20 may comprise a cylindrical tube 22 and a pair of end fittings 24 secured to the opposite ends of tube 22 by double shear bonds. The tube 22 may comprise, but is not limited to a composite material, such as multiple laminated plies of a fiber reinforced polymer resin. An example of multiple plies of a fiber reinforced polymer resin may be carbon fiber reinforced epoxy. The tube 22 may include an inner tube wall portion 32, and an outer tube wall portion 34 which are co-bonded, as shown in FIG. 2 as a cylinder. Cylindrical tube 22 may have other cross sectional shapes such as, but not limited to square, triangle, hexagon, or pentagon.

Each of the end fittings 24 may be, but is not limited to a metal such as aluminum or titanium, or a composite end fitting. A metallic end fitting may be formed by casting, machining or other common manufacturing techniques. A composite end fitting may include metallic inserts and/or metallic bushings. Each of the end fittings 24 may include a clevis 30 provided with aligned openings 26. While a double tab 31 configuration is shown, a single tab or triple tab configuration or more than 3 tab configurations are within the scope of the embodiments of the disclosure. The openings 26 may allow the strut 20 to be connected by pins (not shown) or other pivoting and/or fastening means to structural components, such as in an aircraft.

Depending upon the particular application, strut 20 may function to transfer axial loads bi-directionally, so that the strut 20 may be either placed in tension or compression, or both in alternating fashion, along its central axis. Each of the end fittings 24 may include an axial opening 28 that is aligned with the central axis of the tube 22 for purposes which will become apparent later.

As best seen in FIG. 2, each of the end fittings 24 may include an interior area 35 that is generally hollow in order to reduce the weight of the end fitting 24, and a generally cylindrical open end defining a tapered, cylindrical tang 36. The tang 36 may have a tapered cross section that is disposed between and co-bonded to the inner and outer tube wall portions 32, 34, respectively. As will be discussed later, the inner and outer tube wall portions 32, 34, may be formed from laminates having tapered profiles that complementally match the tapered cross section of the tang 36 so as to define an overlapping, double scarf joint 37. The inner and outer tube wall portions 32, 34, respectively form, in combination with the tang 36, an overlapping, double shear bond at the double scarf joint 37.

While not shown, a coupling means, such as, but not limited to a fastener may couple wall portions 32 and 34 to the tang 36. A coupling means may work with co-bonding or singularly without co-bonding.

Reference is now made to FIGS. 3-9 which depict an alternate construction of the composite tube 22 having co-bonded end fittings 24. The tang 36 on each of the end fittings 24 may be provided with a plurality of inner and outer steps 38 such that the outside diameter of the tang 36 progressively decreases in the direction away from axial opening 28, while the inside diameter of the tang 36 increases. The walls of each of the steps 38 are cylindrical.

Figure 4:
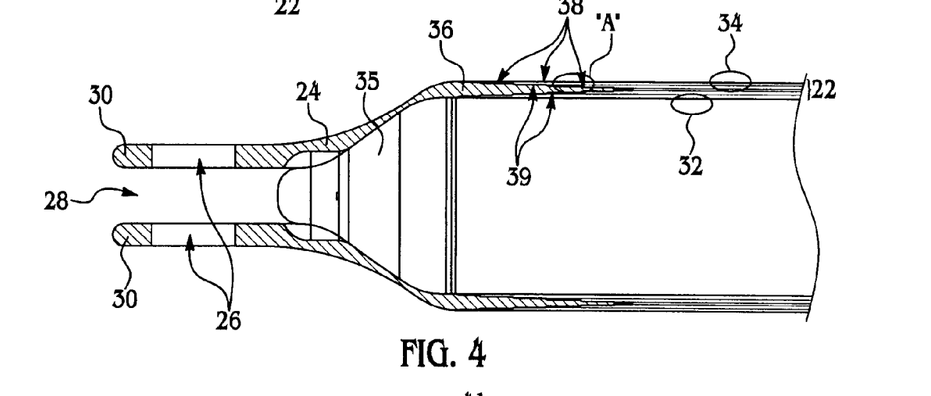
FIG. 4 is a longitudinal sectional illustration taken through the end of the strut shown in FIG. 1, but depicting a stepped bond joint which forms another embodiment.
Figure 5:
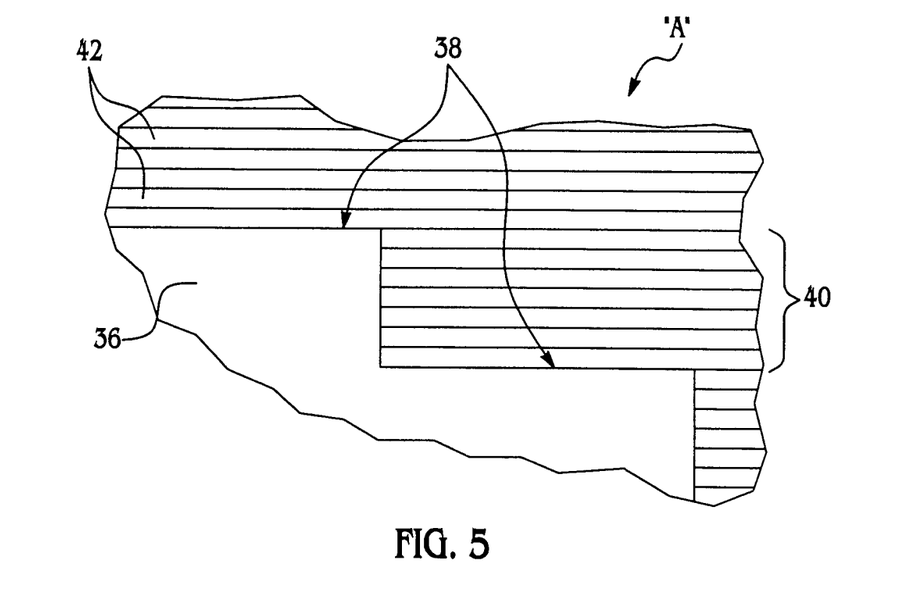
FIG. 5 is an enlarged illustration of a section of the stepped bond joint shown in FIG. 4, designated as "A".
Figure 6:
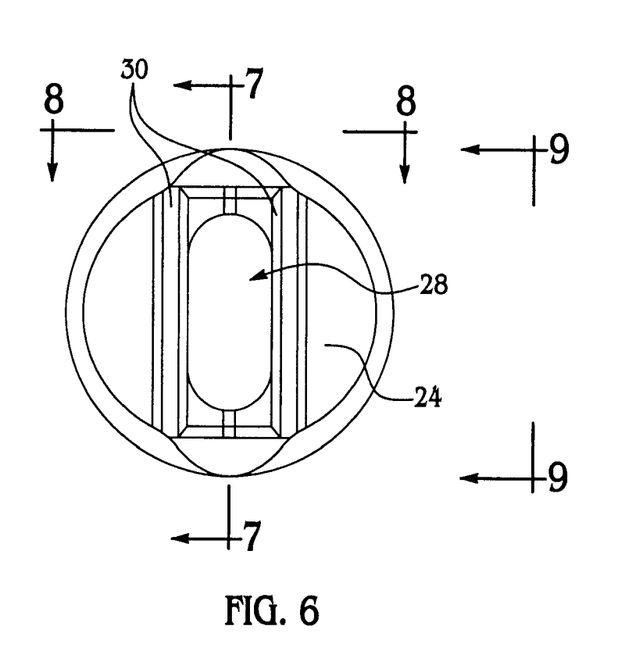
FIG. 6 is an end illustration of the end fitting shown in FIG. 3.
Figure 7:
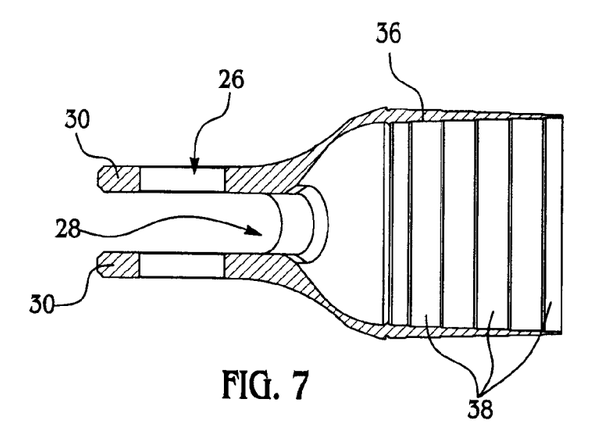
FIG. 7 is a sectional illustration taken along the line 7-7 in FIG. 6.
Figure 8:
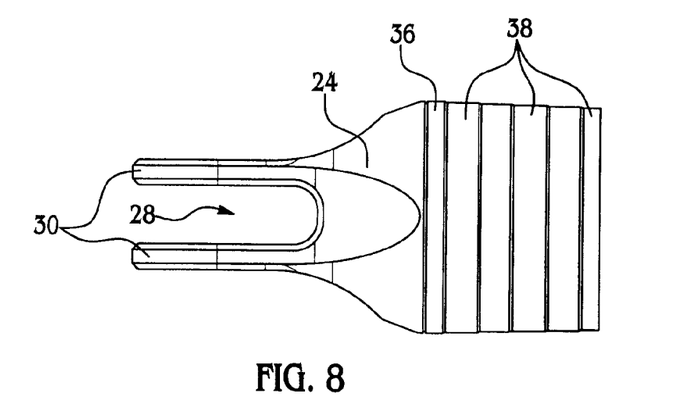
FIG. 8 is a plan illustration of the end fitting shown in FIG. 6.
Figure 9:
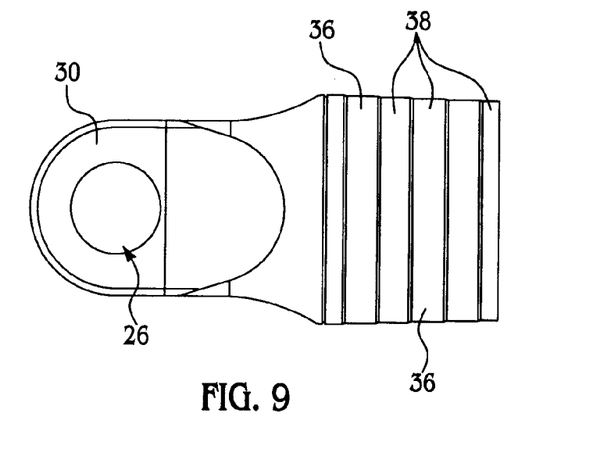
FIG. 9 is a side illustration of the end fitting shown in FIG. 6.

As can be seen in FIGS. 4 and 5, the inner and outer tube wall portions 32, 34 each may comprise a plurality of plies of composite material, such as, but not limited to a fiber reinforced polymer resin which may be fabricated using techniques described later below. The laminated plies 42 (FIG. 5) may be arranged in groups 40 having progressively greater lengths in the direction of the end fitting 24. Each ply group 40 terminates at an end of one of the steps 38, so that the plies 42 are effectively tailored in their lengths to complementally match the profile of the steps 38. The plies 42 are layed up to form the inner and outer tube wall portions 32, 34 which may be co-bonded along with the tang 36 to form a stepped, double shear bond joint 39. The use of the steps 38 may effectively divide the total amount of the residual stress in the resulting bond so that these stresses peak at each step 38. In some applications, the stepped, double shear bond joint 39 shown in FIG. 4 may be preferable to the double scarf joint 37 described in connection with FIG. 2.

Figure 10:
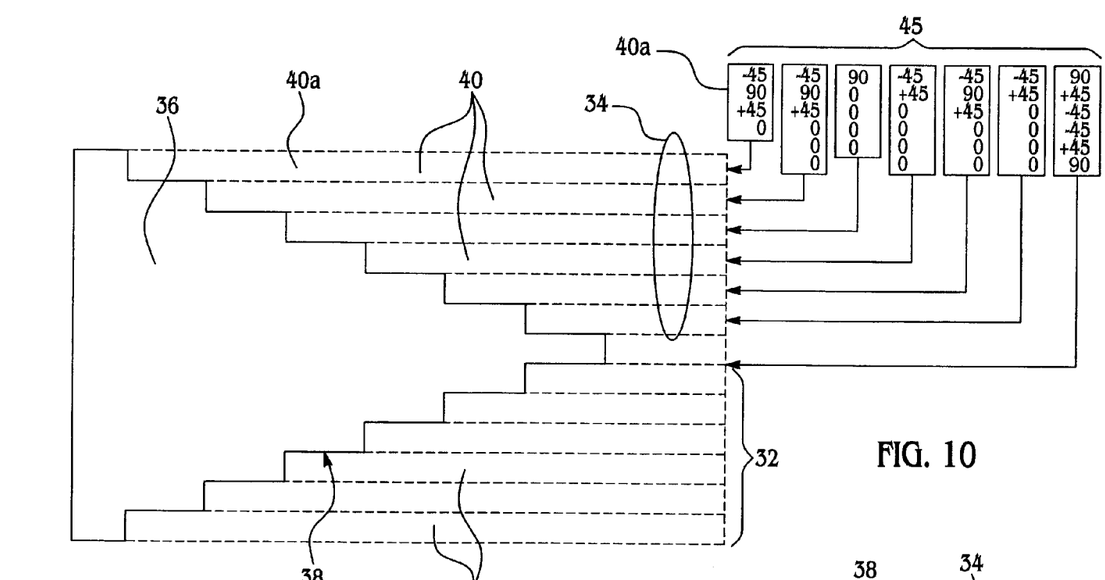
FIG. 10 is a diagrammatic illustration of a ply layup schedule for an embodiment.

FIG. 10 shows one particular ply build up that may be suitable for use in a strut 20 used to support, for example, an engine and/or pylon (not shown) on a wing of an aircraft. The number and orientation of the plies in each group 40 forming the outer tube wall portion 34 are shown in a ply schedule 45. For example, the outermost ply group 40a comprises 4 individual plies having reinforcing fibers respectively oriented at 45, 90, −45 and 0 degrees, relative to an orientation reference axis. The number of plies in each group 40 will depend on the depth of each of the steps 38 on the tang 36, as well as the thickness of the individual plies.

Figure 11:
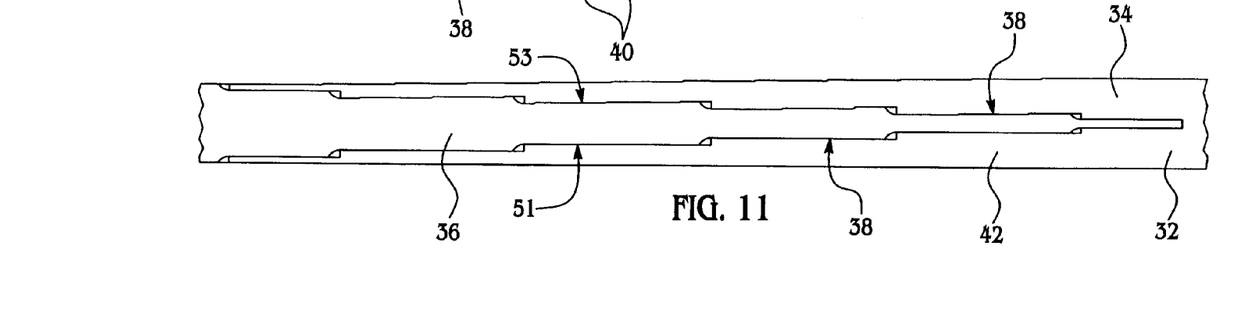
FIG. 11 is a cross sectional illustration of an alternate form of a tang.

FIG. 11 illustrates an alternate form of the tang 36. The wall 51 of each step 38 on the inside face of the tang 36 is cylindrical in shape. However, the wall 53 of each of the steps on the outside face of the tang 36 are conical in shape, resulting in an inwardly tapered wall profile. Tapering of walls 53 reduces the amount of material in the tang 36, thereby reducing the weight of the fitting 24. Alternatively, the walls 51 may be tapered and the walls 53 may be cylindrical.

Figure 12:
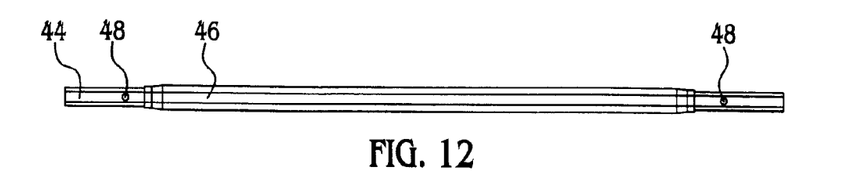
FIG. 12 is a side illustration of a mandrel rod having an expandable mandrel shown in a deflated condition.
Figure 19:
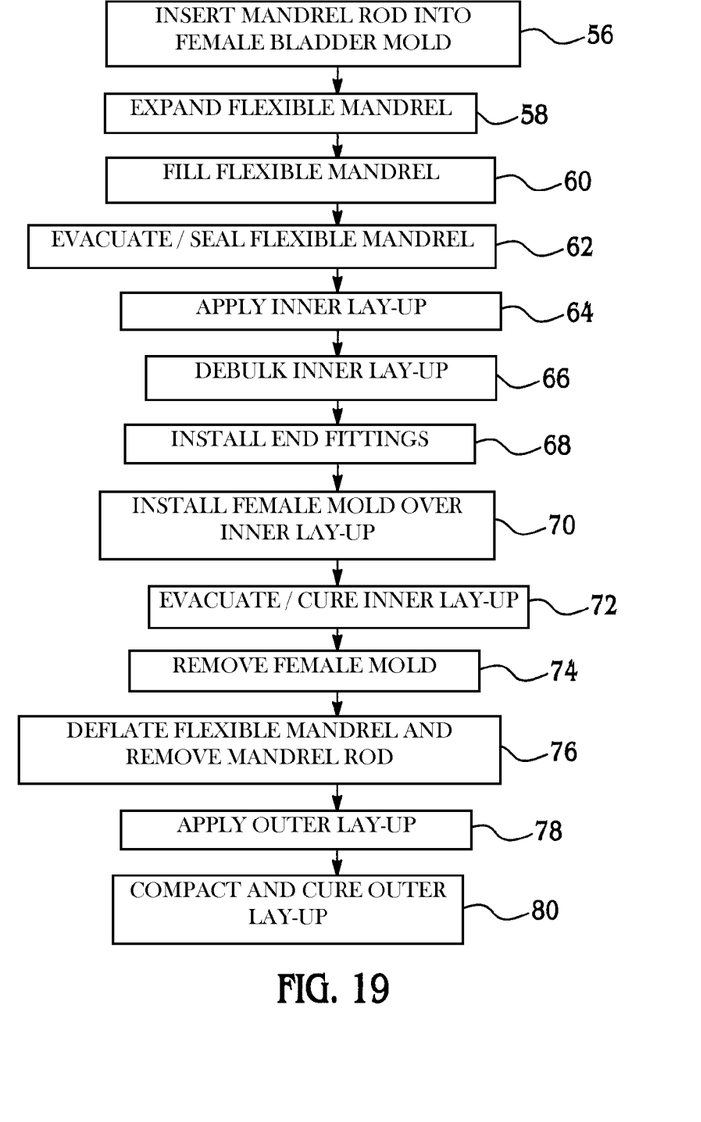
FIG. 19 is a simplified flow diagram showing the steps for making the composite tube having co-bonded end fittings according to an embodiment.

Attention is directed to FIG. 19 along with FIGS. 12-18 which depict the steps in making the composite tube 22 having co-bonded end fittings 24 described above in connection with FIGS. 1-11. As shown in FIG. 12, a mandrel rod 44 is provided with an flexible mandrel 46 that may circumscribe the mandrel rod 44. In the illustrated example, the flexible mandrel 46 may comprise a flexible, inflatable bladder. Mandrel rod 44 may include a pair of indexing marks 48 on opposite ends thereof, for purposes that will become apparent later.

Figure 13:
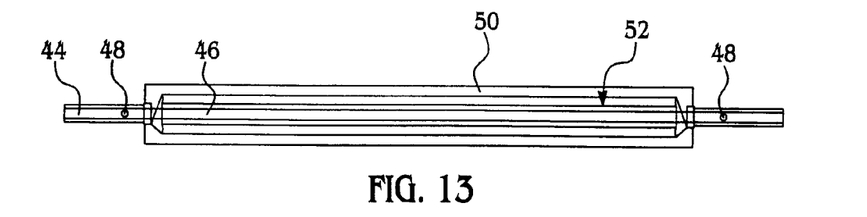
FIG. 13 is a longitudinal sectional illustration of a female mandrel mold into which mandrel rod depicted in FIG. 10 has been inserted.
Figure 14:
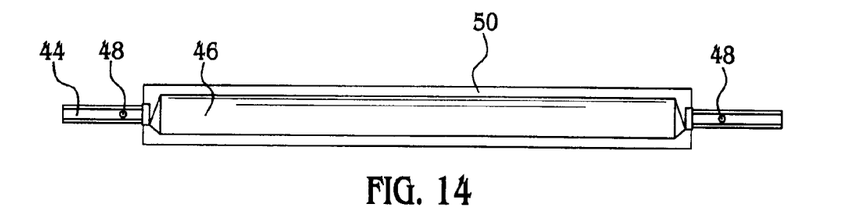
FIG. 14 is an illustration similar to FIG. 11, but showing the mandrel having been inflated.

Beginning with step 56, the mandrel rod 44 may be axially inserted into a female bladder mold 50, as shown in FIG. 13, which has an interior cavity wall 52 corresponding to the desired shape of a mandrel to be formed. The female bladder mold 50 may then be evacuated, causing the flexible mandrel 46 to expand within the cavity. Next, at step 58, the flexible mandrel 46 may be filled with a granular material such as, but not limited to sand or ceramic beads. A pressurized source of the granular material may be connected to an axial conduit (not shown) within the mandrel rod 44, which in turn is connected with the interior of the flexible mandrel 46.

Next, at step 62, the flexible mandrel 46 may be sealed and evacuated to form a partial vacuum. This partial vacuum may compress the flexible mandrel 46 against the granulated filler material so as to make it somewhat rigid and assume the desired mandrel shape. It should be noted here that other types of constructions could be used to form the flexible mandrel 46. For example, an expandable metal or breakdown mandrel (not shown) could be employed for ply lay-up rather than the flexible bladder illustrated in the drawings. The flexible mandrel 46 or other known, internal bagging material may then be used during lay-up and/or for curing of the inner lay-up 41.

At step 64, multiple hoop plies of a composite material may be applied to the flexible mandrel 46, as shown in FIG. 13, resulting in the formation of a first, inner lay-up 41 that may define the inner tube wall portion, such as inner tube wall portion 32 of FIG. 2. The plies forming inner lay-up 41 may comprise, for example, successive, uncured layers of carbon reinforced epoxy material in the form of sheets or a tape in which the orientation direction of the reinforcing fiber alternates according to known ply orientation schemes. The inner lay-up 41 may be formed by wrapping each of the hoop plies one revolution (360 degrees) or less around the flexible mandrel 46. In other words, wrap each hoop ply of the inner lay-up 41 around the flexible mandrel 46 only once or less. By avoiding plies that wrap more than one revolution, the reinforcing fibers are allowed to move radially during subsequent compaction of the inner lay-up 41.

At step 66, the inner lay-up 41 may be debulked to remove excess air from the lay-up plies and thereby better consolidate the plies. The debulking process may be carried out within a vacuum bag (not shown) using vacuum pressure.

Next, at step 68 the end fittings 24 are installed over the inner lay-up 41. This step is carried out by passing the end fittings 24 over the ends of the mandrel rod 44, allowing the mandrel rod 44 to pass through the axial openings 28 in the end fittings 24. The tang 36 of the end fittings 24 are sleeved over the inner lay-up 41. As previously indicated, the lengths of the plies forming the inner lay-up 41 may be tailored so as to either match the tapered cross section of the tang 36 of the end fitting 24 shown in FIG. 2, or the steps 38 of the end fitting 24 shown in FIGS. 4 and 5. As the end fittings 24 are installed over the outer ends of the inner lay-up 41, the indexing marks 48 may be used to align the end fittings 24 relative to each other so that the openings 26 in the clevis of the two fittings 24 are in a desired rotational position relative to each other.

Figure 15:
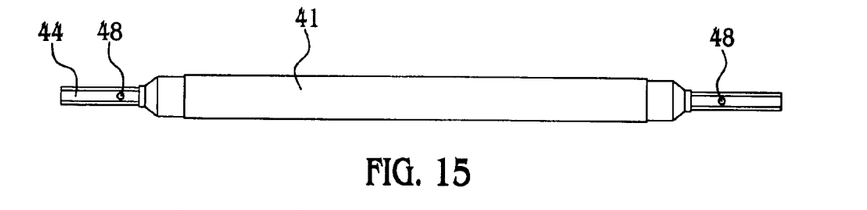
FIG. 15 is a side illustration of the mandrel wrapped with multiple plies of fiber reinforced material to form an inner tube wall portion.
Figure 16:
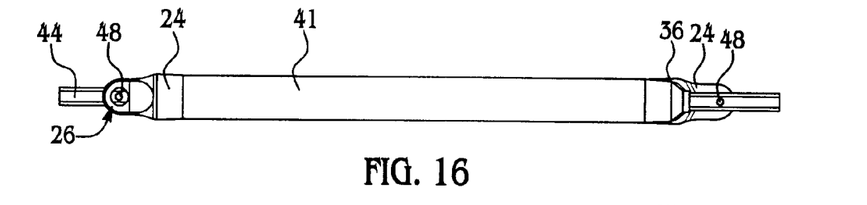
FIG. 16 is an illustration similar to FIG. 13, but showing the first lay-up having been debulked and end fittings having been installed over the inner tube wall portion.
Figure 17:
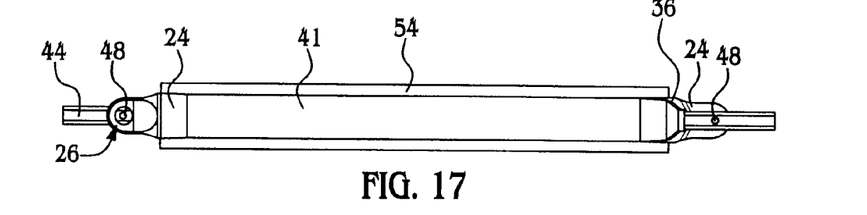
FIG. 17 is an illustration similar to FIG. 14 but showing the first lay-up having been placed in a lay-up mold for compaction and curing.
Figure 18:
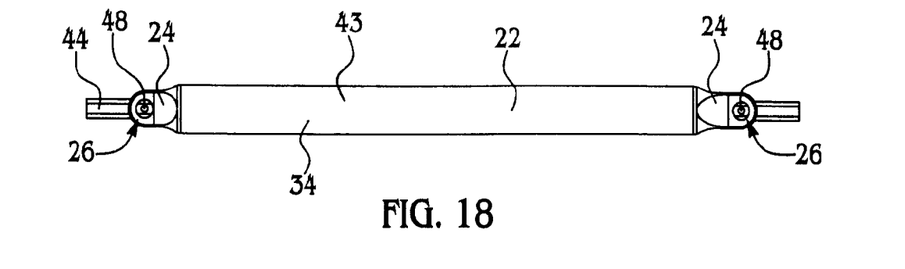
FIG. 18 a side illustration showing the second lay-up having been applied over sections of the end fittings and the first lay-up to form an outer tube wall portion.

At step 70, a female mold 54 may be placed over the inner lay-up 41 and the tang 36, as can be seen in FIG. 15. The female mold 54 may be evacuated, creating a partial vacuum that draws flexible mandrel 46 shown in FIG. 14 and the plies in the inner lay-up 41 into contact with the interior walls of the female mold 54 shown in FIG. 17 thereby compacting the plies. The female mold 54 may be placed in an autoclave and heated to the necessary temperature in order to cure the inner lay-up either during or after the compaction process.

Next, the female mold 54 may be removed at step 74. At this point, the inner lay-up 41 defining the inner tube wall portion 32 may be fully compacted and cured, and may be co-bonded to the inside face of the tang 36 of end fitting 24. Then, at step 76, the flexible mandrel 46 may be deflated and the mandrel rod 44 is removed from the cylindrical tube 22

At step 78, multiple, uncured plies of composite material may be applied over the inner lay-up as well as over tangs 36 to form a second, outer lay-up 43 that defines the outer tube wall portion 34 of FIG. 2. The plies in the outer lay-up 43 may be similar or dissimilar to those used in the inner lay-up, comprising, for example, carbon fiber reinforced epoxy resin, in which the plies are arranged in alternating layers of multiple fiber orientations (e.g. +45/0/90). Other ply orientations may be used. The plies in the outer lay-up 43 may be wrapped one or more times around the inner lay-up 41. Like the inner lay-up 41, the plies in the outer lay-up 43 may be tailored in length so as to conform to either the profile of the unstepped tapered tang 36 shown in FIG. 2, or the stepped tang 36 shown in FIGS. 4 and 5. It should be noted here that the number of piles used to form the inner and outer lay-ups 41, 43 respectively may vary depending on the particular application and performance requirements. In one embodiment for example, a build up of thirty three plies was found to be satisfactory for the inner lay-up 41 and thirty three plies on the outer lay-up 43 as well.

Figure 4A:
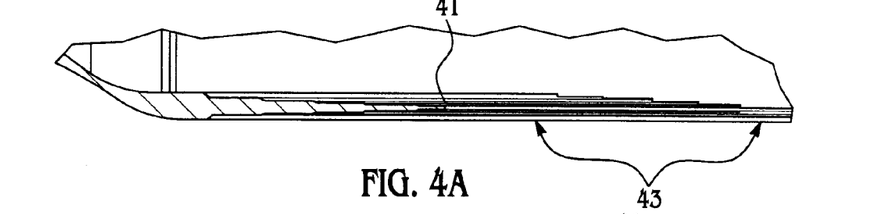
FIG. 4A is a fragmentary, longitudinal section illustration taken through the end of the strut shown in FIG. 1, but showing an alternate lay-up arrangement.
Figure 4B:
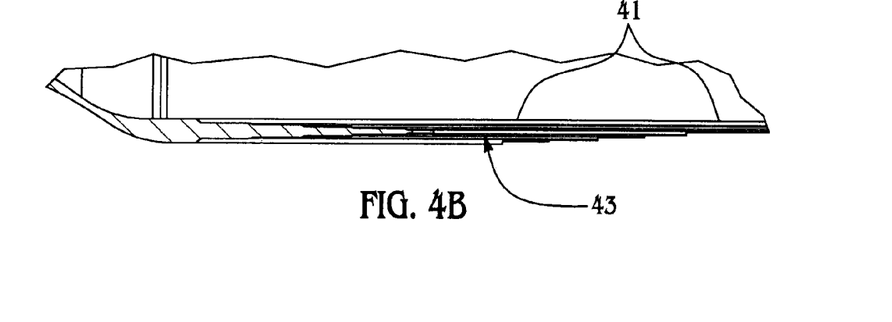
FIG. 4B is a fragmentary, longitudinal section illustration taken through the end of the strut shown in FIG. 1, but showing another lay-up arrangement.

It may also be possible for an inner lay-up 41 or an outer lay-up 43 to not extend the entire length of cylindrical tube 22. As shown in FIGS. 4A and 4B, inner lay-up 41 or outer lay-up 43 may taper over a bond to outer lay-up 43 or inner lay-up 41, respectively. Tapering sections on both tube ends may form a double butted cylindrical tube 22. In another embodiment, a single butted tube may be formed.

At step 80, the outer lay-up 43 may be subjected to compaction and curing using conventional techniques. For example, the cylindrical tube 22 may be vacuum bagged with the vacuum bag being evacuated and placed in an autoclave (not shown) at elevated temperature until the outer lay-up 43 may be fully compacted and cured. As a result of this compaction and curing process, the outer lay-up 43 forming the outer tube wall portion 34 is co-bonded with the inner tube wall portion 32 and with the outer face of the tang 36 on the end fittings 24.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A structural member, comprising:
a composite material tube, the composite material tube comprising a first cured inner tube and a second cured outer tube, wherein the first cured inner tube and the second cured outer tube are co-bonded along a respective wall of the first cured inner tube and the second cured outer tube; and
a metal fitting, wherein a portion of the metal fitting is disposed between and co-bonded to the first cured inner tube and the second cured outer tube,
wherein an intersection between the metal fitting and the first cured inner tube comprises a first bond joint, and wherein an intersection between the metal fitting and the second cured outer tube comprises a second bond joint, each of the first and second bond joints comprising a scarf joint.

2. The structural member of claim 1, wherein the metal fitting comprises a cylindrical section, and wherein a thickness of the cylindrical section tapers in a direction toward the composite material tube.

3. The structural member of claim 1, wherein the first cured inner tube and the second cured outer tube each comprise multiple plies of composite material.

4. The structural member of claim 1, wherein one of the first cured inner tube and the second cured outer tube extends only a portion of the length of the composite material tube.

5. The structural member of claim 1, wherein each of the first cured inner tube and the second cured outer tube comprises a different structural layup.

6. The structural member of claim 1, wherein each of the first cured inner tube and the second cured outer tube comprises a different number of plies.

7. The structural member of claim 1, wherein the metal fitting comprises a hollow interior, and a circumferentially extending wall surrounding the hollow interior.

8. The structural member of claim 1, wherein the metal fitting is co-bonded to the first cured inner tube and the second cured outer tube exclusive of a separate non-integral layer of adhesive.

9. A structural member, comprising:
a composite material tube, the composite material tube comprising a first cured inner tube and a second cured outer tube, wherein the first cured inner tube and the second cured outer tube are co-bonded along a respective wall of the first cured inner tube and the second cured outer tube; and
a metal fitting comprising a cylindrical portion, wherein the first cured inner tube is bonded to the metal fitting along a third inner wall of the cylindrical portion to form a scarf joint, and wherein the second cured outer tube is bonded to the metal fitting along a fourth outer wall of the cylindrical portion to form a scarf joint.

* * * * *